Figure 5:
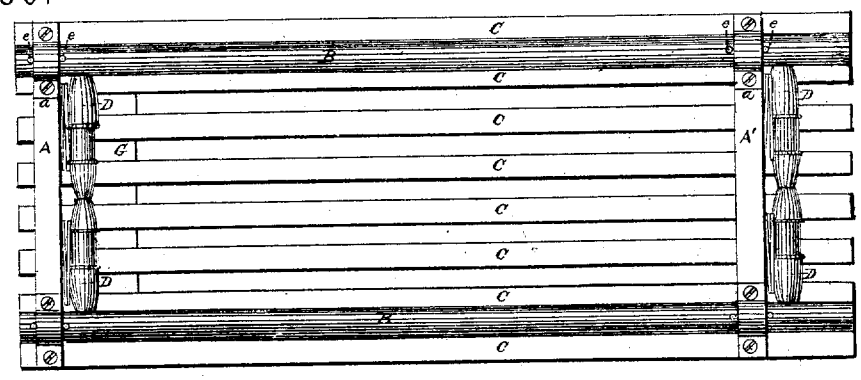

L. B. MORSE.

Cot-Beds.

No. 5,380. Reissued April 29, 1873.

WITNESSES.

David T. Pray.

S. A. Wood.

INVENTOR.

Leander B. Morse,
by his Attorney
N. C. Lombard

A.M. PHOTO-LITHOGRAPHIC CO. N.Y. (OSBORNE'S PROCESS.)

UNITED STATES PATENT OFFICE.

LEANDER B. MORSE, OF ATHOL, MASSACHUSETTS, ASSIGNOR OF ONE-HALF INTEREST TO LABAN MORSE.

IMPROVEMENT IN COT-BEDS.

Specification forming part of Letters Patent No. 135,573, dated February 4, 1873; reissue No. 5,380, dated April 29, 1873; application filed March 29, 1873.

*To all whom it may concern:*

Be it known that I, LEANDER B. MORSE, of Athol, in the county of Worcester and State of Massachusetts, have invented certain new and useful Improvements in Cot-Beds, of which the following, taken in connection with the accompanying drawing, is a specification:

My invention relates to a cot-bed that can be folded, when not in use, so as not to occupy so much space as when extended; and it consists, first, of a frame made up of two cross-bars—one near the head and the other near the foot, and two sills or girders arranged longitudinally under said cross-bars and secured thereto by means of straps in such a manner that they may be partially rotated therein; said girders being made preferably round or cylindrical in form as being the cheapest, though square sills may be used by turning round places near each end to receive the straps by which they are secured to the cross-bars. Each of said sills or girders has inserted and secured therein two or more legs, which are held in an extended position by means of a jointed brace, one end of which is secured to the leg near its bottom and the other to the cross-bar near its middle—the joint in said brace being provided with shoulders to form a stop. Said girders may be arranged cross-wise of the bed-frame and hinged to the side bars instead of the cross-bars, as shown in the drawing. It consists, in the second place, in the use, in a bed-bottom, of slats arranged longitudinally thereof, resting upon bearings near either end, and provided with vertical slots through the same directly over said bearings, to receive the free ends of pins set in the cross-bars, which serve as bearings for said slats, in combination with a holding-down bar, secured across the bed-bottom above the slats and directly over said cross-bars. It consists, in the third place, in the combination, with the slats, arranged and constructed as above described, of a head-board placed above said slats and hinged to the cross-bar on which said slats rest in such a manner that it may stand upon its edge in a vertical position, or be folded down upon said slats, while it may readily be removed to enable the slats to be unshipped, if desired.

Figure 6:
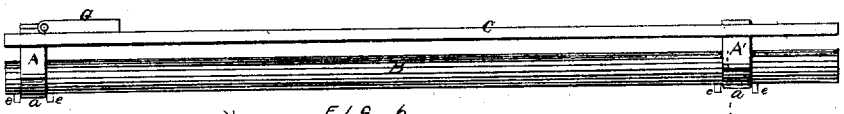
Figure 4:
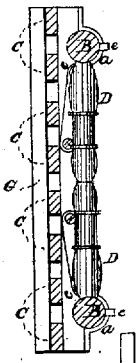
Figure 3:
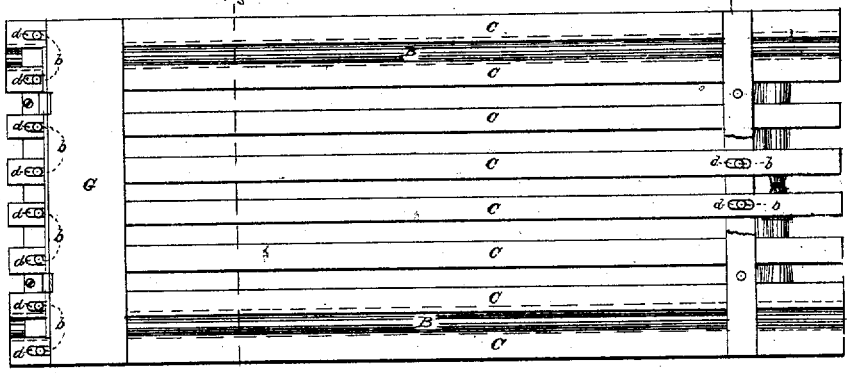
Figure 1:
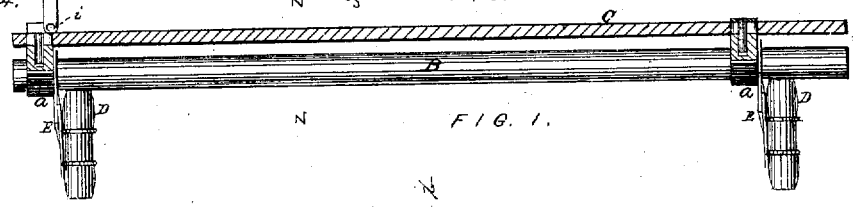
Figure 2:
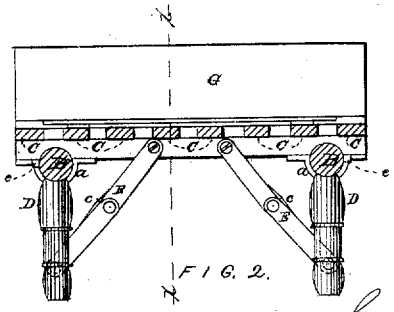

Figure 1 of the drawing is a longitudinal section of a cot-bed embodying my invention—the section being taken on line *x x* on Fig. 2, and showing the bedstead in position for use. Fig. 2 is a transverse section of the same on line *z z*. Fig. 3 is a plan of the same folded. Fig. 4 is a transverse section on line *y y*. Fig. 5 is a plan of the under side of the same folded, and Fig. 6 is an edge view of the same folded.

A and A′ are two cross-bars of a length equal to the desired width of the bed, and having a semicircular groove cut across their under sides, near each end thereof, into which are fitted the cylindrical sills or girders B B, around which are bent the straps *a*, which are secured to the cross-bars A and A′, thus forming a cylindrical bearing for the girders B, in which they may revolve; the cross-bars A and A′ resting upon the girders B at or near either end thereof and forming the supports for the slats C C. Each of the girders B B has inserted therein two or more legs, D D, which support the bedstead when the girders B are rotated so as to bring said legs into a vertical position, as seen in Figs. 1 and 2. To the lower end of each of the legs D D is pivoted one end of a jointed brace, E, the upper end of which is pivoted to the cross-bar A or A′, the center joint of said brace being provided with shoulders *c c* to serve as a stop to limit the movement of said joint in one direction, said stops being so adjusted that in straightening the brace to throw the legs into a vertical position the center joint may be moved a little past a line drawn through the center of the pivots at the ends of said brace, for the purpose of preventing the brace from being thrown out of position by the load placed upon the bed. The girders B B may be made square with round journals for the bearings of the cross-bars A and A′; but I prefer the cylindrical girder, as being the cheapest and lightest for the same strength. The cross-bars A and A′ are held in position on the girders B and prevented from slipping endwise thereon by pins *e e* inserted in said girders on either side of the straps or caps *a;* or, instead of the pins *e e*, a shallow flat groove may be formed around the girders, into which the cross-bars A and A′ and the straps *a* fit. In the upper side of the cross-bars A and A′ is inserted a series of metallic pins, *b b*, projecting above said cross-bars a distance about equal to the thickness of the slats C C, said pins fitting into the slots *d d* formed in either end of each of the slats C C. F is a cleat or holding-down bar placed across the bed above the slats C, directly above the cross-bar A′, to which it is secured by the pins or screws *h h*. G is a head-board, placed across the other end of the bed, over the cross-bar A, to which it is hinged in such a manner that it may be turned up to a vertical position, as seen in Fig. 1, or be folded down upon the slats, as seen in Figs. 3 and 4, so arranged that in either position it serves the same purpose as the bar F, preventing the slats C from being displaced from the pins *b b*. The pins *b b* and the slots *d d* serve to keep the slats C C in position laterally and at the same time allow the slats to give a little lengthwise when the weight of a person is placed upon them.

This construction enables me to make a cot-bed that can be folded into a comparatively small space when not in use, and be readily extended for use at a considerable less cost than any good cot-bed now in the market.

The head-board may be easily and readily removed by withdrawing the hinged pin *i*.

What I claim as new, and desire to secure by Letters Patent of the United States, is—

1. A bed-frame consisting of the cross-bars A and A′ and the girders or side pieces B B, provided with the legs D, and secured to said cross-bars in such a manner that, while they serve as stretchers to keep said bars the proper distance apart, they may be rotated for the purpose of folding the legs under the bed when not in use, substantially as described.

2. The combination of the slats C C provided with the slots *d d*, the cross-bar A having inserted in its upper side the pins *b b* to fit into said slots, and the holding-down cleat F, all constructed and arranged substantially as described.

3. In combination with the slats C C provided with slots *d d*, and the cross-bar A having inserted therein the pins *b b*, I claim the head-board G, hinged to the cross-bar A in such a manner that it may be placed in a perpendicular position or folded down onto the slats and serve the purpose of holding the slats in position on the pins while they are free to move endwise thereon, substantially as described.

4. The cylindrical girders B B having the legs D secured therein and secured to the bed-frame by the straps *a*, whether said girders are arranged longitudinally or transversely of the frame, substantially as described.

Executed at Athol, Massachusetts, this 25th day of March, 1873.

LEANDER B. MORSE.

Witnesses:
THOMAS H. GOODSPEED,
WILLIE R. BEMIS.